(No Model.)
R. A. CHESEBROUGH.
PROCESS OF MANUFACTURING GAS.
No. 306,810. Patented Oct. 21, 1884.
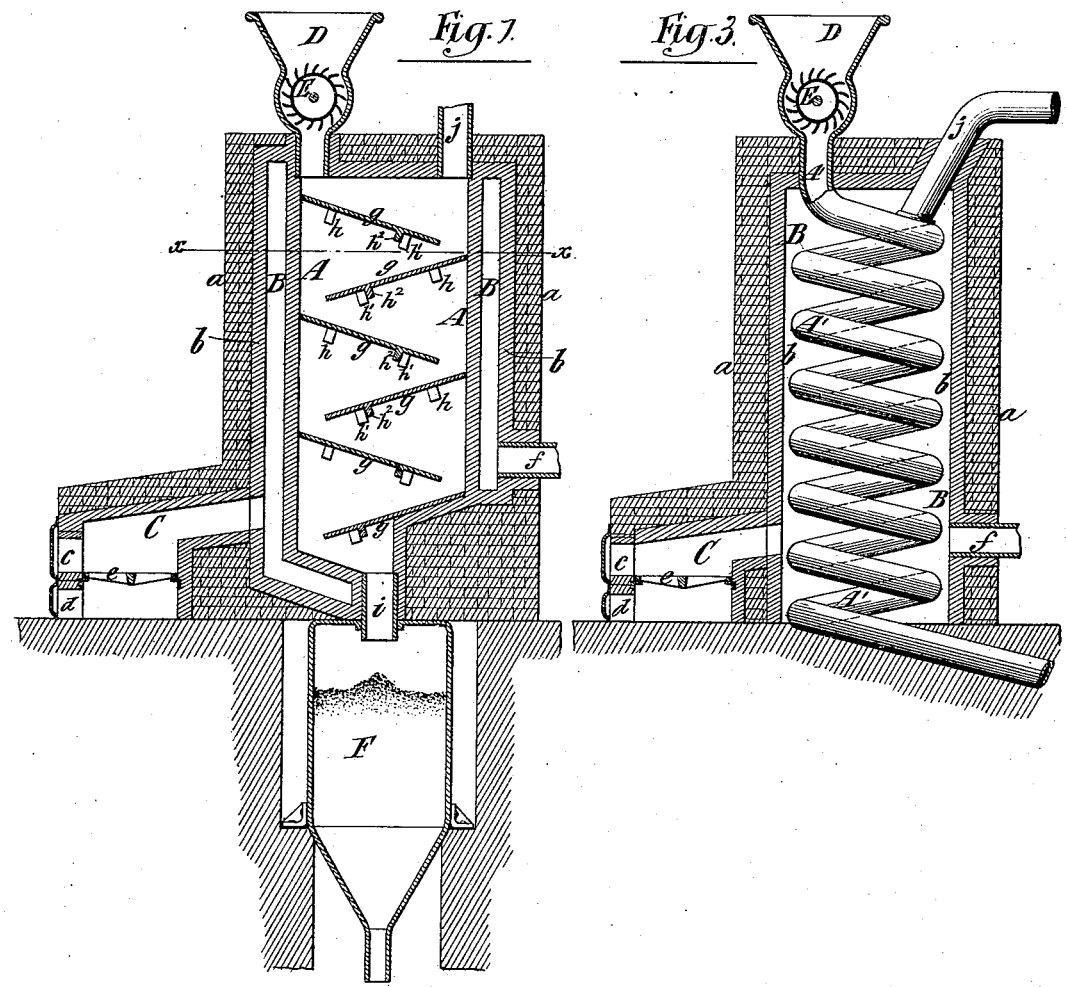
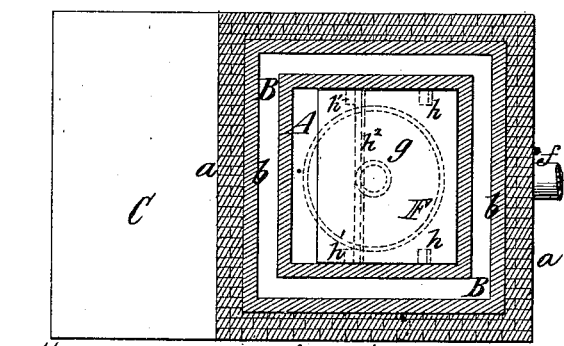

UNITED STATES PATENT OFFICE.

ROBERT A. CHESEBROUGH, OF NEW YORK, N. Y.

PROCESS OF MANUFACTURING GAS.

SPECIFICATION forming part of Letters Patent No. 306,810, dated October 21, 1884.

Application filed April 12, 1884. (No specimens.)

*To all whom it may concern:*

Be it known that I, ROBERT A. CHESEBROUGH, of the city and county of New York, and State of New York, have invented a new and useful Improvement in the Manufacture of Gas, of which the following is a specification.

Spent bone-black which has been employed in filtering vaseline, lubricating-oils, and other hydrocarbon products retains a considerable quantity of oil or hydrocarbon matter, the quantity varying from ten to thirty per centum of the weight of the oil or product filtered, according to the care with which the bone-black is drained. The oil or hydrocarbon matter retained by the bone-black has heretofore either been burned up, and thus destroyed and lost, in the process of revivifying spent bone-black, or has been recovered in the form of oil by distillation.

The object of my invention is to utilize the oil or hydrocarbon matter contained in the bone-black in the manufacture of gas, and when my invention is carried out with bone-black which has been used for filtering, the bone-black will be revivified by the heat to which it is subjected to convert the contained oil into gas, while, when the invention is carried into effect with bone-black which has been a second time used for filtering, the removal of the hydrocarbon matter enhances the value of the spent bone-black, and it will find a more ready sale.

My invention consists in an improvement in the manufacture of gas by subjecting bone-black charged with oil or hydrocarbon matter to a heat sufficient to vaporize the hydrocarbon matter and convert it into a permanent gas.

My invention also consists in the method of utilizing the hydrocarbon matter contained in bone-black after its being used as a filtering material by subjecting the bone-black to a heat sufficient to vaporize the hydrocarbon and convert it into a permanent gas.

In the accompanying drawings, Figure 1 is a vertical section of an apparatus for the purpose above described. Fig. 2 is a horizontal section thereof on the dotted line $x\ x$, Fig. 1; and Fig. 3 is a vertical section of an apparatus of modified form, also for carrying out my invention.

Similar letters of reference designate corresponding parts in the several figures.

Referring first to Figs. 1 and 2, A designates a retort, which is inclosed within a heating-chamber, B. As here shown, the heating-chamber B is formed of brick-work $a$, having a fire-brick or fire-clay lining, $b$, and the retort as well as the lining $b$ may be made of tiles or slabs of fire-clay or other refractory material; or the lining may be thus constituted and the retort itself made of metal. When made of tiles or slabs of refractory material, the tiles or slabs may be formed with tongues and grooves provided for fitting them together, so as to produce close joints, as is well known in structures of this class. As here shown, the retort A and its surrounding chamber B are rectangular in transverse section; but they may be of other form, if desired.

C designates a furnace, having the usual fire and ash-pit doors, $c\ d$, and grate-bars $e$, and from this furnace the heated products of combustion pass into the lower part of the heating-chamber B, and rise therein around the retort A, the smoke finally escaping at $f$ on the side of the heating-chamber opposite the inlet. At the top of the retort is an inlet for bone-black, surmounted by a hopper, D, in which is arranged a feeding-cylinder, E, which may be rotated, and which is provided with ribs which carry the wet oily mass of bone-black downward and into the retort continuously and uniformly. The bone-black falls upon the upper of a series of shelves or plane surfaces, $g$, which are inclined in opposite directions alternately, and may be built into the retort or removably supported upon projections $h\ h'$ at the sides of the retort, the shelves in the latter case being provided with downward projections $h^2$, which come behind the projections $h'$ and prevent the inclined shelves from sliding off their supports. At the bottom of the retort is an outlet, $i$, for the bone-black, and F is a cooler, into which it is delivered, and from the lower and cooler portion of which the bone-black is delivered. The feed of bone-black into the upper part of the retort and the withdrawal of the bone-black from the cooler after a considerable quantity has been deposited therein may be uniform, and the operation will then be continuous.

From the upper part of the retort A extends a gas-outlet, $j$, and as the bone-black runs down and falls from shelf to shelf it becomes more limpid, and any oil or hydrocarbon contained in it is evolved in the form of a permanent gas and escapes through the pipe $j$. No purifying is needed, because of the action of the bone-black upon the evolved gas. The running of the bone-black down each shelf and its fall from one shelf to another afford ample opportunity for the free escape of the permanent gas therefrom, and it may be conducted direct to the gas-holder.

The apparatus shown in Fig. 3 comprises a heating-chamber, B, formed by brick-work $a$ and a fire-brick lining, $b$, and within which is arranged the retort A', consisting, as here shown, of a spiral trunk or worm supplied with bone-black at the upper end by a hopper, D, and rotary feeder E, and having its lower end continued to a sufficient distance to deliver the contents in a cool state. The bone-black passing downward through the retort is subjected to great heat from a furnace, C $c$ $d$ $e$, and the waste products of combustion pass away through an outlet or escape, $f$, at the side of the chamber B opposite the inlet from the furnace. The gas evolved from the bone-black in its downward passage passes away through the pipe $j$ to the gas-holder. (Not here shown.)

If desired, other pipes like $j$ may lead from different convolutions of the helical or spiral retort A', and so take the gas off more freely.

I am aware that it is not new to employ bone-black as a filtering material for hydrocarbon matter or oils and to recover the hydrocarbon matter remaining in the bone-black by subjecting the bone-black to a process of distillation, whereby the hydrocarbon matter will be recovered in the form of oil. Such process I do not claim as of my invention.

In carrying out my invention I subject the bone-black to a heat sufficient not only to vaporize the hydrocarbon matter, but also to fix the vapors and convert them into a permanent gas, which may be used, without further "fixing," for illuminating purposes.

What I claim as my invention, and desire to secure by Letters Patent, is—

1. The improvement in the art of manufacturing gas, consisting in subjecting bone-black charged with oil or hydrocarbon matter to a heat sufficient to vaporize the hydrocarbon matter and convert it into a permanent gas, substantially as herein described.

2. The method of utilizing the hydrocarbon matter contained in bone-black after its use as a filtering material, consisting in subjecting the bone-black to a heat sufficient to vaporize the hydrocarbon matter and convert it into a permanent gas, substantially as herein described.

ROBT. A. CHESEBROUGH.

Witnesses:
LOUIS M. F. WHITEHEAD,
C. HALL.